United States Patent [19]
Greaves

[11] Patent Number: 5,408,529
[45] Date of Patent: Apr. 18, 1995

[54] DUAL TONE DETECTOR OPERABLE IN THE PRESENCE OF SPEECH OR BACKGROUND NOISE AND METHOD THEREFOR

[75] Inventor: Carlos A. Greaves, Austin, Tex.

[73] Assignee: Motorola, Inc., Schaumburg, Ill.

[21] Appl. No.: 70,611

[22] Filed: Jun. 2, 1993

[51] Int. Cl.⁶ .............................................. H04M 1/50
[52] U.S. Cl. .................................. 379/386; 379/283; 327/46
[58] Field of Search ............................... 379/386, 283; 370/110.3; 328/137

[56] References Cited

U.S. PATENT DOCUMENTS

| 4,347,408 | 8/1982 | Ito et al. ......................... | 379/283 X |
| 4,626,629 | 12/1986 | Premoli et al. .............. | 370/110.3 X |
| 5,214,693 | 5/1993 | Chujo .................................. | 379/386 |

OTHER PUBLICATIONS

Clark, et al.; "Station Signaling and Announcement Sybsystem: Hardware for Automated Coin Toll Service"; The Bell System Tech. Jour.; vol. 58, No. 6, pp. 1225–1249 (1979).
"Dual Tone Multiple Frequency Receiver"; Motorola Telecommunications Device Data; pp. 2-540-2-544 (1989).

*Primary Examiner*—James L. Dwyer
*Assistant Examiner*—M. W. Shehata
*Attorney, Agent, or Firm*—Paul J. Polansky

[57] ABSTRACT

A dual tone detector (100) for a single dual tone, a dual tone multi-frequency (DTMF), or similar system processes an input signal through both bandpass (103) and band reject (104) tone detectors. If both the bandpass (103) and band reject (104) tone detectors detect a tone, then the dual tone detector (100) provides a tone detect output signal. If only the bandpass tone detector (103), which is susceptible to false tones, detects a tone, then a voice input signal is muted and the tone detector (100) activates the tone detect output signal only if both the bandpass (103) and band reject (104) tone detectors subsequently detect a tone. In one embodiment, a dual bandpass/band reject tone detector (120) processes the input signal through shared front-end band reject filters (121, 122), limiters (124), resonators (127, 128), and a processing section (130) in order to save circuit area. Limiter and peak detector functions are also implemented in shared circuitry to further reduce circuit area.

19 Claims, 7 Drawing Sheets

DUAL TONE DETECTOR OPERABLE IN THE PRESENCE OF SPEECH OR BACKGROUND NOISE AND METHOD THEREFOR

FIELD OF THE INVENTION

This invention relates generally to signal processing, and more particularly, to tone detection.

BACKGROUND OF THE INVENTION

In voice communication systems, tones are frequently used for signaling. A dual tone, commonly referred to simply as a "tone", is represented by two true tones whose frequencies are separated in bandwidth, in order to avoid false tone detections. Thus, if normal speech patterns or noise produce a signal with a high amount of energy near one true tone frequency, it is unlikely that there will be enough energy near the other true tone frequency to result in a spurious tone detection. This type of tone signaling is utilized, for example, in dual tone multi-frequency (DTMF) signaling used in North American telephone systems.

Known tone detectors typically employ the band separation technique, and these tone detectors usually fall within one of two categories. One type, known as a band reject tone detector, filters an input signal through two band select filters corresponding to the two DTMF frequency bands. A band select filter associated with the low DTMF frequency band, rejects signal frequencies in the high DTMF frequency band, and vice versa. The outputs of the band select filters are processed through signal limiters and then passed through resonators. Resonators tuned to each of the DTMF frequencies provide an output signal of sufficient energy to trip a subsequent comparator when the input signal has a sufficient magnitude at one of the DTMF frequencies. If the outputs of resonators in both the low and high DTMF frequency bands trip their respective comparators, then the tone detector provides a tone detect output signal to indicate the occurrence of a DTMF tone.

However, the band reject tone detector is susceptible to missing valid tones. If there is enough energy in other signals while a tone is present, the speech interferes with the tone and the band reject tone detector is unable to discern the tone. For example, speech interference may be due to a recorded announcement, customer speech, an operator, or background noise.

A second type of tone detector is known as a bandpass tone detector. In the bandpass tone detector, the input signal is first passed through bandpass filters corresponding to the low and high tone ranges. If a signal within the passband of the filter has a sufficient amplitude, it will trip a comparator. If two true tones are detected, the bandpass tone detector will provide a tone detect indication. While immune from missing tones, the bandpass tone detector is nonetheless subject to false tone detects, such as when random speech has a large amount of energy in two tone frequencies.

Some band separation tone detectors attempt to avoid the problem of speech interference by muting a local line before sending a tone, and only detecting tones during silent periods. However, some tone signaling systems allow tones at all times and the system cannot be continuously muted. Thus, a tone detector which is able to correctly discern tones in the presence of speech is desirable.

SUMMARY OF THE INVENTION

Accordingly, there is provided, in one form, a dual tone detector operable in the presence of speech or background noise, including a bandpass tone detector, a band reject tone detector, and a logic portion. The bandpass tone detector has an input for receiving an input signal conducted on a transmission line, and an output for providing a bandpass tone detect signal. The input signal is characterized as intermittently including tones. The band reject tone detector has an input for receiving the input signal, and an output for providing a band reject tone detect signal. The logic portion is coupled to the bandpass tone detector and to the band reject tone detector, and provides a tone detect signal in response to both the bandpass tone detect signal being active and to the band reject tone detect signal being active. The logic portion also provides a mute signal in response to the bandpass tone detect signal being active and the band reject tone detect signal being inactive.

In another form, there is provided a method for detecting dual tones in the presence of speech or background noise. An input signal is received via a transmission line. A tone is detected in the input signal in a bandpass tone detector to provide a bandpass tone detect signal in an active state thereof to indicate a detection of the dual tone. The tone in the input signal is detected in a band reject tone detector to provide a band reject tone detect signal in an active state thereof to indicate a detection of the dual tone. A tone detect output signal is provided in response to both the bandpass tone detect signal being active and the band reject tone signal being active. In response to the bandpass tone detect signal being active and the band reject tone detect signal being inactive, a voice input signal is muted from the transmission line and the tone detect output signal is subsequently provided in response to both the bandpass tone detect signal being active and the band reject tone signal being active.

These and other features and advantages will be more clearly understood from the following detailed description taken in conjunction with the accompanying drawings.

BRIEF DESCRIPTION OF THE DRAWINGS

FIG. I illustrates in partial block diagram and partial logic diagram form a band reject dual tone multi-frequency (DTMF) tone detector in accordance with the prior art.

DETAILED DESCRIPTION OF A PREFERRED EMBODIMENT

Figure 1:
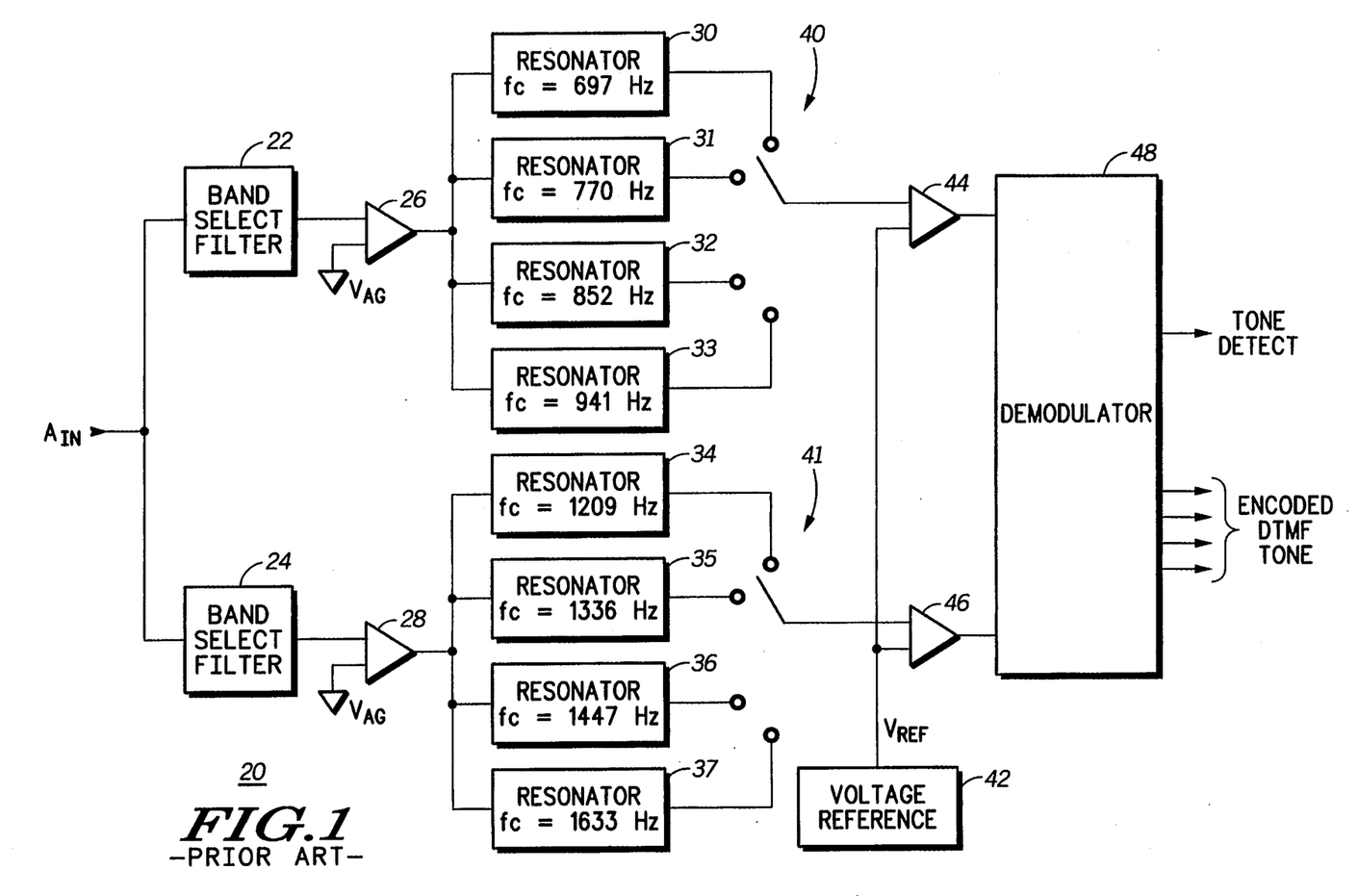

FIG. 1 illustrates in partial block diagram and partial logic diagram form a band reject dual tone multi-frequency (DTMF) detector 20 in accordance with the prior art. DTMF detector 20 includes band select filters 22 and 24, voltage limiters 26 and 28, resonators 30–37, switches 40 and 41, a voltage reference circuit 42, comparators 44 and 46, and a demodulator 48. Band select filter 22 has an input terminal for receiving an input signal labelled "$A_{IN}$", and an output terminal. $A_{IN}$ is a speech signal which includes standard DTMF tone signaling. Band select filter 24 has an input terminal for receiving signal $A_{IN}$, and an output terminal. Voltage limiter 26 has a first input terminal connected to the output terminal of band select filter 22, a second input terminal connected to a power supply voltage terminal labelled "$V_{AG}$", and an output terminal. $V_{AG}$ is an analog ground output terminal having a value approximately halfway between the maximum value and the minimum value that signal $A_{IN}$ may assume. Voltage limiter 28 has a first input terminal connected to the output terminal of band select filter 24, a second input terminal connected to $V_{AG}$, and an output terminal.

Each of resonators 30–33 has an input terminal connected to the output terminal of voltage limiter 26, and an output terminal. Each of resonators 34–37 has an input terminal connected to the output terminal of voltage limiter 28, and an output terminal. Switch 40 selectively connects the output terminals of one of resonators 30–33 to an output terminal of switch 40. Switch 41 selectively connects the output terminals of one of resonators 34–37 to an output terminal of switch 41. Voltage reference 42 provides a voltage reference labelled "$V_{REF}$". Comparator 44 has a first terminal connected to the output terminal of switch 40, a second terminal for receiving $V_{REF}$, and an output terminal. Comparator 46 has a first terminal connected to the output terminal of switch 41, a second terminal for receiving $V_{REF}$, and an output terminal. Demodulator 48 has input terminals connected to the output terminals of comparators 44 and 46, an output terminal for providing a signal labelled "TONE DETECT", and output terminals for providing four signals labelled "ENCODED DTMF TONE".

DTMF detector 20 implements standard DTMF, in which sixteen tones are represented by a combination of one of a set of low-frequency true tones, and one of a set of high-frequency true tones. As used herein, the term "true tone" represents a sinusoidal waveform of a single frequency, whereas the term "tone" by itself represents a signal which includes two true tones, i.e. a dual tone. In standard DTMF, each of the low-frequency tones represents a row on a telephone keypad, and each high-frequency tone represents a column on the telephone keypad. TABLE I represents the row and column assignments in standard DTMF, along with the tone frequency in hertz (Hz) in parentheses.

TABLE I

|  | COL 1 (1209) | COL 2 (1336) | COL 3 (1477) | COL 4 (1633) |
|---|---|---|---|---|
| ROW 1 (697) | 1 | 2 | 3 | A |
| ROW 2 (770) | 4 | 5 | 6 | B |
| ROW 3 (852) | 7 | 8 | 9 | C |
| ROW 4 (941) | * | 0 | # | D |

Band select filters 22 and 24 are filters which reject the frequencies in the opposite filter's band. For example, band select filter 22 is used in the path that decodes the low-frequency tones, and rejects signals in the frequency spectrum within a band covering the high-frequency tones, i.e., from 1209 Hz through 1633 Hz. Also, band select filter 24 rejects signals in the low-frequency range, i.e. from 697 Hz to 941 Hz. The outputs of band select filters 22 and 24 are passed through voltage limiters 26 and 28, respectively. Each voltage limiter is an amplifier which switches the output thereof to full-supply when the input crosses $V_{AG}$. Thus, the signals not rejected by the band select filters will be amplified and a sinusoidal true tone signal will be converted to a square wave having a fundamental frequency component and odd harmonics thereof.

Each resonator is tuned to a corresponding DTMF frequency. If a tone having a true tone corresponding to a given resonator is present, then the output of the corresponding resonator will be activated. Comparators 44 and 46 are each shared between four resonators; however, functionally DTMF detector 20 acts as if the output of each resonator were connected to its own comparator. Switches 40 and 41 are used to multiplex the outputs of the resonators to the inputs of the corresponding comparators.

If a signal passed by a resonator has a large enough amplitude, exceeding $V_{REF}$, then the corresponding comparator will trip when the switch selects the given resonator. Demodulator 48 detects a tone when one of resonator 30–33, and one of resonators 34–37, each detect a tone for a programmable period. Demodulator 48 keeps track of timing information to determine which resonator is connected to a comparator indicating the presence of a true tone, and activates output signal TONE DETECT when a tone is detected for a programmable length of time. Demodulator 48 also provides ENCODED DTMF TONE to indicate which of the sixteen DTMF tone was received.

Tone detector 20 is a band-reject type tone detector, because band select filters 22 and 24 reject signals in the other filter's band. However, tone detector 20 is susceptible to occasionally missing valid tones. Limiters 26 and 28 are high-gain amplifiers in an open-loop configuration, with a reference input terminal connected to mid-supply voltage $V_{AG}$. (Note that the application of the input signals to either the positive or the negative input terminal is arbitrary and thus these designations are omitted.) When the amplitude of the input signal not within the rejected band exceeds $V_{AG}$, the output of the corresponding limiter increases to full-supply. Thus, in the presence of one true tone (a sinusoidal signal), the limiter would produce a square wave with a fundamental frequency equal to that of the tone. In this way, a small-amplitude tone is amplified for better detection in a subsequent resonator. However, when the true tone is accompanied by other frequency components, the energy of the signal at the output of the limiter, at the frequency of the tone, correspondingly decreases. As the energy in these components increases, the amount of energy provided by the limiter at the tone frequency decreases, until eventually the energy is so small that the amplitude of the signal at the output of the resonator is not large enough to trip the comparator. Thus, a valid tone is missed.

Figure 2:
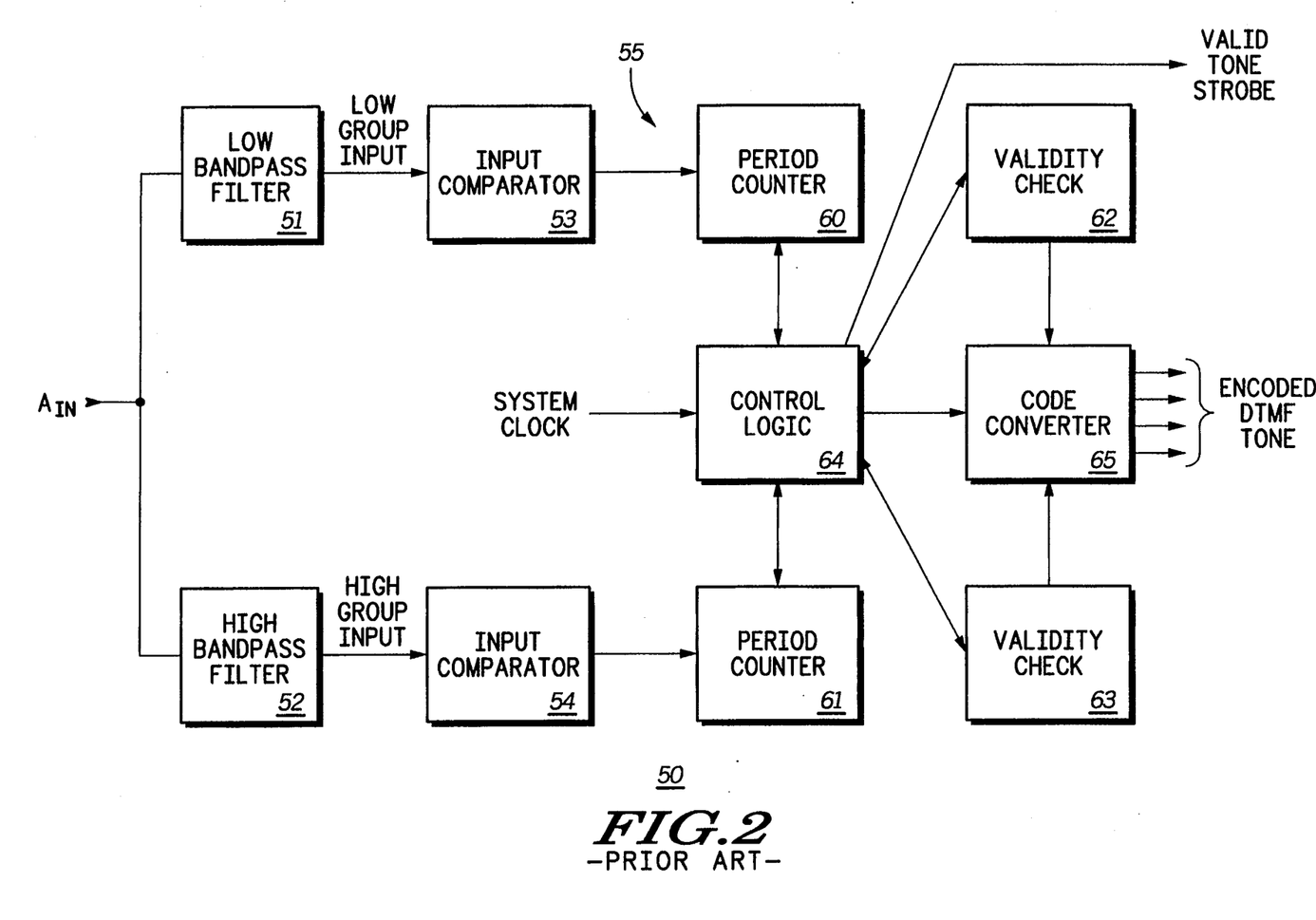
FIG. 2 illustrates in block diagram form a bandpass DTMF tone detector in accordance with the prior art.

FIG. 2 illustrates in block diagram form a bandpass DTMF tone detector 50 in accordance with the prior art. Tone detector 50 includes a low bandpass filter 51, a high bandpass filter 52, input comparators 53 and 54, and a demodulator 55. Low bandpass filter 51 has an input terminal for receiving input signal $A_{IN}$, and an output terminal for providing a signal labelled "LOW GROUP INPUT". High bandpass filter 52 has an input terminal for receiving signal $A_{IN}$, and an output terminal for providing a signal labelled "HIGH GROUP INPUT". Input comparator 53 has an input terminal for receiving LOW GROUP INPUT, and an output terminal. Input comparator 54 has an input terminal for receiving HIGH GROUP INPUT, and an output terminal.

Demodulator 55 includes period counters 60 and 61, validity check blocks 62 and 63, control logic 64, and a code converter 65. Period counter 60 has an input terminal connected to the output terminal of input comparator 53, and control input and output terminals. Period counter 61 has an input terminal connected to the output terminal of input comparator 54, and control input and output terminals. Validity check block 62 has a control input and output terminal, and an output terminal. Validity check block 63 has a control input and output terminal, and an output terminal. Control logic 64 has an input terminal for receiving a system clock, is connected to period counters 60 and 61 and validity check blocks 62 and 63 via their respective control input and output terminals, and has a first control output terminal for providing an output signal labelled "VALID TONE STROBE", and a second control output terminal. Code converter 65 is connected to the output terminals of validity check blocks 62 and 63, is connected to the second control output terminal of control logic 64, and provides the ENCODED DTMF TONE as an output.

Low bandpass filter 51 is a bandpass filter which passes signals within the low DTMF range, i.e., from 697 to 941 Hz, and attenuates signals of other frequencies. Input comparator 53 is an open-loop amplifier which receives the LOW GROUP INPUT from low bandpass filter 51 and amplifies LOW GROUP INPUT to full-supply when it exceeds a threshold. Thus, if LOW GROUP INPUT includes a true tone, input comparator 53 will produce a square wave having a fundamental frequency equal to that of the true tone. The frequency of the tone is then detected by period counter 60 in demodulator 55. Period counter 60 includes a zero-crossing detector and a counter, and counts the number of transitions of the output of input comparator 53 to determine which of the four DTMF tone frequencies within the low DTMF band is present, if any.

Likewise, high bandpass filter 52 is a bandpass filter which passes signals within the high DTMF range, i.e., from 1209 to 1633 Hz, and attenuates signals of other frequencies. Input comparator 54 is an open-loop amplifier which receives the HIGH GROUP INPUT from high bandpass filter 52 and amplifies HIGH GROUP INPUT to full-supply when it exceeds a threshold. Thus, if HIGH GROUP INPUT includes a true tone, input comparator 54 will produce a square wave having a fundamental frequency equal to that of the true tone. The frequency of the tone is then detected by period counter 61 in demodulator 55. Period counter 61 includes a zero-crossing detector and a counter, and counts the number of transitions of the output of input comparator 54 to determine which of the four DTMF tone frequencies within the high DTMF band is present, if any.

Validity check blocks 62 and 63 each determine whether, if a tone is detected within a corresponding band, there is also a tone present in the other band. If so, control logic 64 indicates to code converter 65 which low DTMF and high DTMF band tones are present. Code converter 65 then provides a digital code, ENCODED DTMF OUTPUT, indicative of which of the sixteen possible DTMF tones is present.

While tone detector 50 does not miss valid tones, it is susceptible to occasionally detecting false tones. If there is enough energy in the low DTMF band, period counter 60 may count a number of zero crossings corresponding to one of the low DTMF frequencies. Occasionally, when period counter 60 falsely detects a tone in the low DTMF range, periods counter 61 also falsely detects a tone in the high DTMF range, resulting in a false tone detect.

One method of reducing the number of false tone detects is to increase the order of low bandpass filter 51 and high bandpass filter 52. However, increasing the order of the filter increases integrated circuit cost, and eventually the added cost outweighs the reduction in false tone detects. Another method of avoiding the false detects inherent in the bandpass tone detector is to mute the line when tones are expected to be transmitted, and to detect received tones only during silent intervals. However, in some circumstances tones are used for signaling during times when the user is speaking or far-end speech, such as a telephone operator or a recorded message, is present. For example, the depositing of coins in a pay telephone is recorded by a series of tones. However, the coins may be deposited while the user is talking, while there is a large amount of noise around the pay telephone, while the operator is talking, or while a recorded message is being played. To avoid this problem, G. Clark et al. disclose a coin tone receiver in "Station Signaling and Announcement Subsystem: Hardware for Automated Coin Toll Service," *The Bell System Technical Journal*, vol. 58, no. 6 (July-August 1979), pp. 1225-1249, which is illustrated in FIG. 3.

Figure 3:
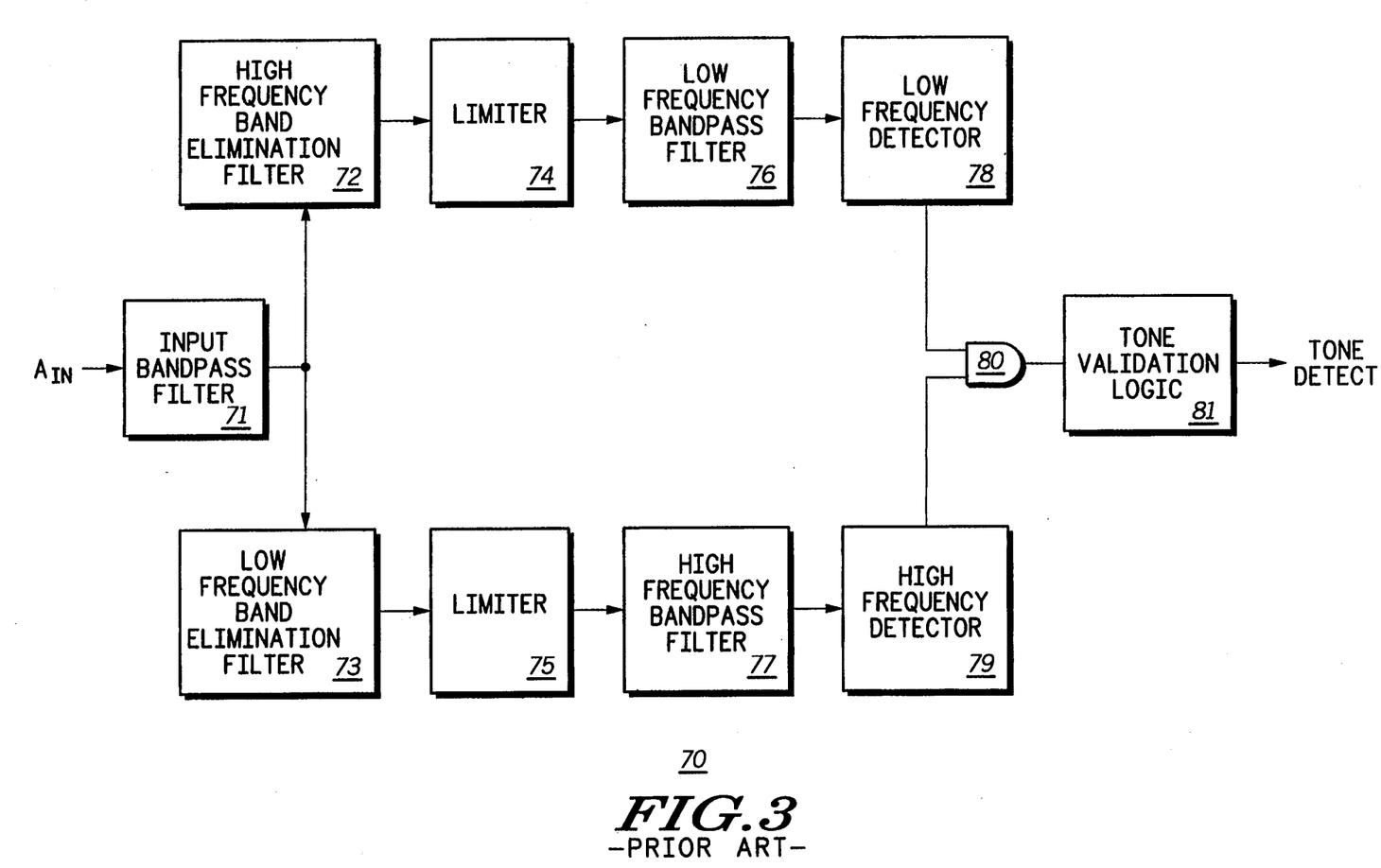
FIG. 3 illustrates in partial block diagram and partial logic diagram form a coin tone receiver in accordance with the prior art.

FIG. 3 illustrates in partial block diagram and partial logic diagram form a coin tone receiver 70 in accordance with the prior art. Coin tone receiver 70 includes an input bandpass filter 71, a high frequency band elimination filter 72, a low frequency band elimination filter 73, limiters 74 and 75, a low frequency bandpass filter 76, a high frequency bandpass filter 77, a low frequency detector 78, a high frequency detector 79, an AND gate 80, and a tone validation logic block 81. Input bandpass filter 71 has an input terminal for receiving signal $A_{IN}$, and an output terminal. High frequency band elimination filter 72 has an input terminal connected to the output terminal of input bandpass filter 71, and an output terminal. Low frequency band elimination filter 73 has an input terminal connected to the output terminal of input bandpass filter 71, and an output terminal. Limiter 74 has an input terminal connected to the output terminal of high frequency band elimination filter 72, and an output terminal. Limiter 75 has an input terminal connected to the output terminal of low frequency band elimination filter 73, and an output terminal. Low frequency bandpass filter 76 has an input terminal connected to the output terminal of limiter 74, and an output terminal. High frequency bandpass filter 77 has an input terminal connected to the output terminal of limiter 75, and an output terminal. Low frequency detector 78 has an input terminal connected to the output terminal of low frequency bandpass filter 76, and an output terminal. High frequency detector 79 has an input terminal connected to the output terminal of high frequency bandpass filter 77, and an output terminal. AND gate 80 has a first input terminal connected to the output terminal of low frequency detector 78, a second input terminal connected to the output terminal of high frequency detector 79, and an output terminal. Tone validation logic block 81 has an input terminal connected to the output terminal of AND gate 80, and an output terminal for providing the TONE DETECT signal.

Coin tone receiver 70 is a band reject tone detector modified to include input bandpass filter 71. High frequency band elimination filter 72 corresponds to band select filter 22 in FIG. 1; limiter 74 corresponds to limiter 26; low frequency bandpass filter 76 corresponds to resonators 30–33; and low frequency detector 78 corresponds to comparator 44. Since a coin tone is only a single tone, low frequency bandpass filter 76 includes only a single resonator tuned to the low frequency true tone of the coin tone. Likewise, low frequency band elimination filter 73 corresponds to band select filter 24; limiter 75 corresponds to limiter 28; high frequency bandpass filter 77 corresponds to resonators 34–37; and high frequency detector 79 corresponds to comparator 46. AND gate 80 provides a voltage at its output terminal at a logic high if both a low frequency true tone and the high frequency true tone of the coin tone are simultaneously detected. Tone validation logic 81 provides TONE DETECT if the output of AND gate 80 is at a logic high for a sufficient period of time to indicate a tone. Coin tone receiver 70 reduces the number of missed tones over band reject DTMF detector 20 by the inclusion of bandpass filters 71, at the expense of occasional false tone detects.

Figure 4:
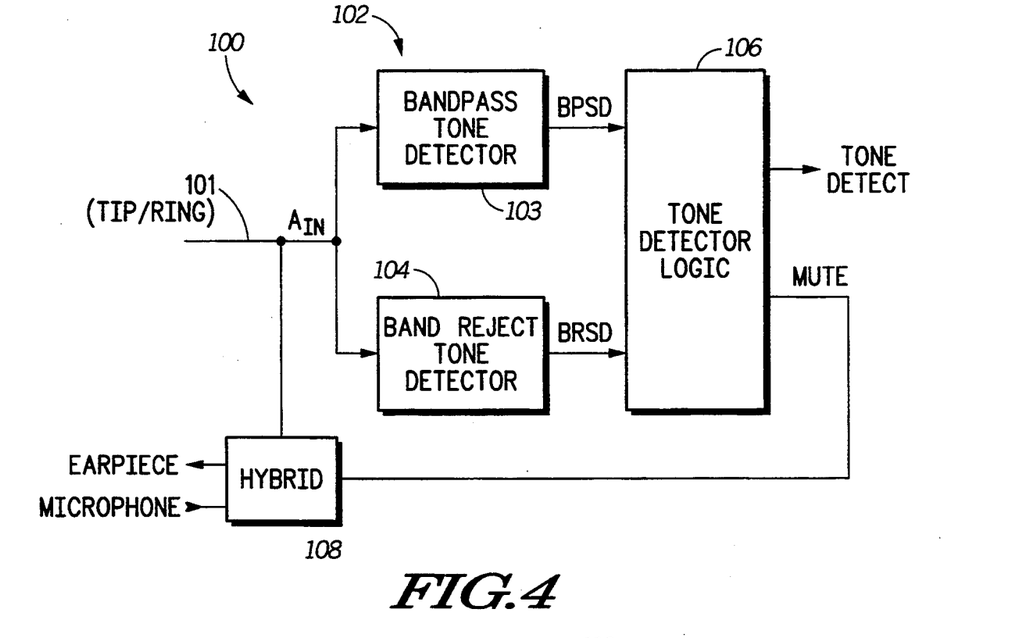
FIG. 4 illustrates in block diagram form a dual tone detector operable in the presence of speech or background noise according to the present invention.

FIG. 4 illustrates in block diagram form a tone detector operable in the presence of speech or background noise 100 according to the present invention. Tone detector 100 is connected to a telephone TIP/RING signal line 101 and receives signal $A_{IN}$ thereon. Tone detector 100 avoids the inherent tradeoffs among known bandpass and band reject tone detectors by providing tone detect signals based on both techniques, and then detecting a tone conditionally based on these two signals. To achieve this purpose, tone detector 100 includes bandpass/band reject tone detector 102 having a bandpass tone detector 103 and a band reject tone detector 104, and a tone detector logic block 106. Tone detector logic block 106 takes advantage of the over-inclusiveness of the bandpass-type tone detector, and the under-inclusiveness of the band reject-type tone detector, to provide a TONE DETECT indication with virtually perfect accuracy.

Bandpass tone detector 103 receives signal $A_{IN}$, and provides an output signal labelled "BPSD" when it detects a tone by the bandpass technique. Bandpass tone detector 103 may be a conventional bandpass tone detector such as bandpass tone detector 50 illustrated in FIG. 2. Band reject tone detector 104 also receives signal $A_{IN}$, but provides an output signal labelled "BRSD" when it detects a tone by the band reject technique. Band reject tone detector 104 may be a conventional band reject tone detector such as band reject tone detector 20 illustrated in FIG. 1.

Figure 5:
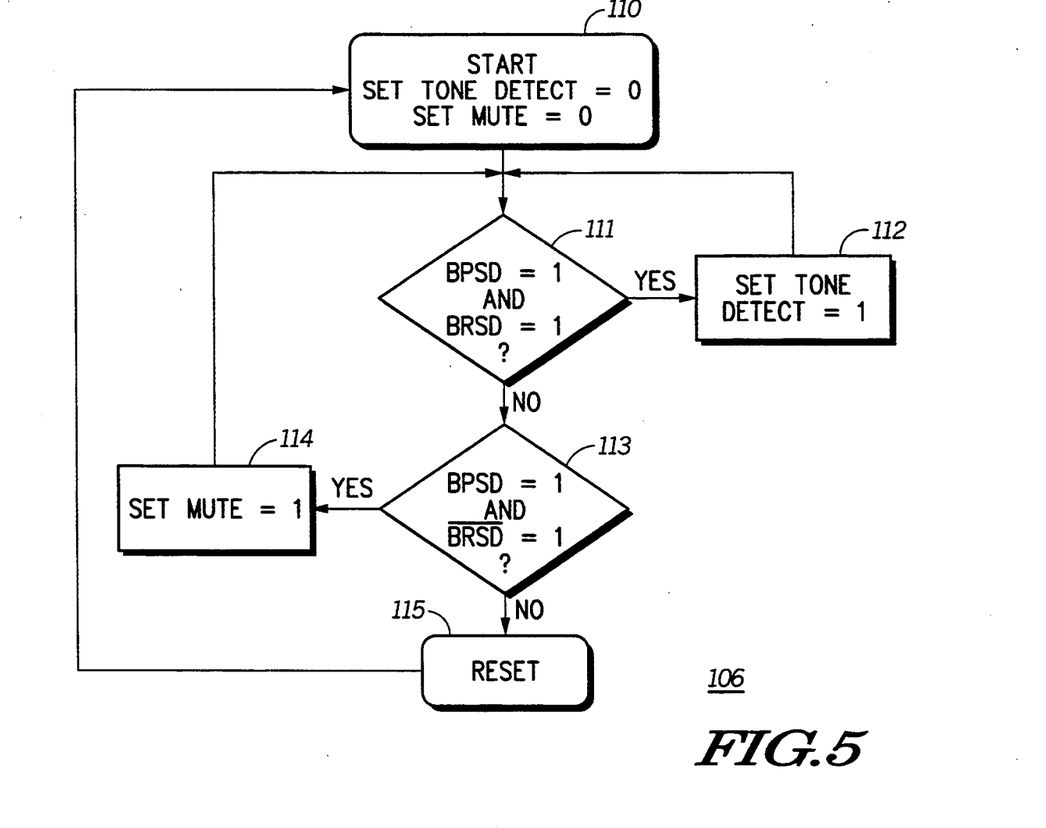
FIG. 5 illustrates a flow chart of the tone detector logic block of FIG. 4.

Tone detector logic block 106 is best understood with reference to FIG. 5, which illustrates a flow chart of tone detector logic block 106 of FIG. 4. At a starting step 110, signal TONE DETECT and a signal labelled "MUTE" are set to their inactive logic levels, a logic low or binary zero in the illustrated embodiment. If tone detector logic block 106 recognizes both BPSD and BRSD being active at step 111, it concludes that a tone is present and sets TONE DETECT to its active logic level (binary one) at step 112, and continues testing signals BPSD and BRSD. However, if this condition is not met, then ((BPSD=1) AND ($\overline{BRSD}$=1)) is tested at step 113. If this condition is true, then at step 114 tone detector logic block 106 sets MUTE to its active logic level (binary one) and continues testing signals BPSD and BRSD. If neither condition is met, then tone detector logic block 106 goes into a reset state at step 115, and returns to starting step 110, clearing TONE DETECT and MUTE to a binary zero.

This logic flow ensures that tones are detected reliably and accurately. Returning to FIG. 4, if bandpass tone detector 103 detects a tone, then tone detector logic block 106 activates signal MUTE. Upon activation of MUTE, a hybrid 108 decouples the local telephone set's MICROPHONE input signal from TIP/RING line 101 to prevent any local sounds from interfering with tone detection. Hybrid 108 is a conventional two-wire/four-wire coupler which couples the local MICROPHONE and EARPIECE signals to the telephone line. Note that tone detector logic block 106 may be implemented using either software or any conventional logic design techniques to implement the flow chart of FIG. 5.

Figure 6:
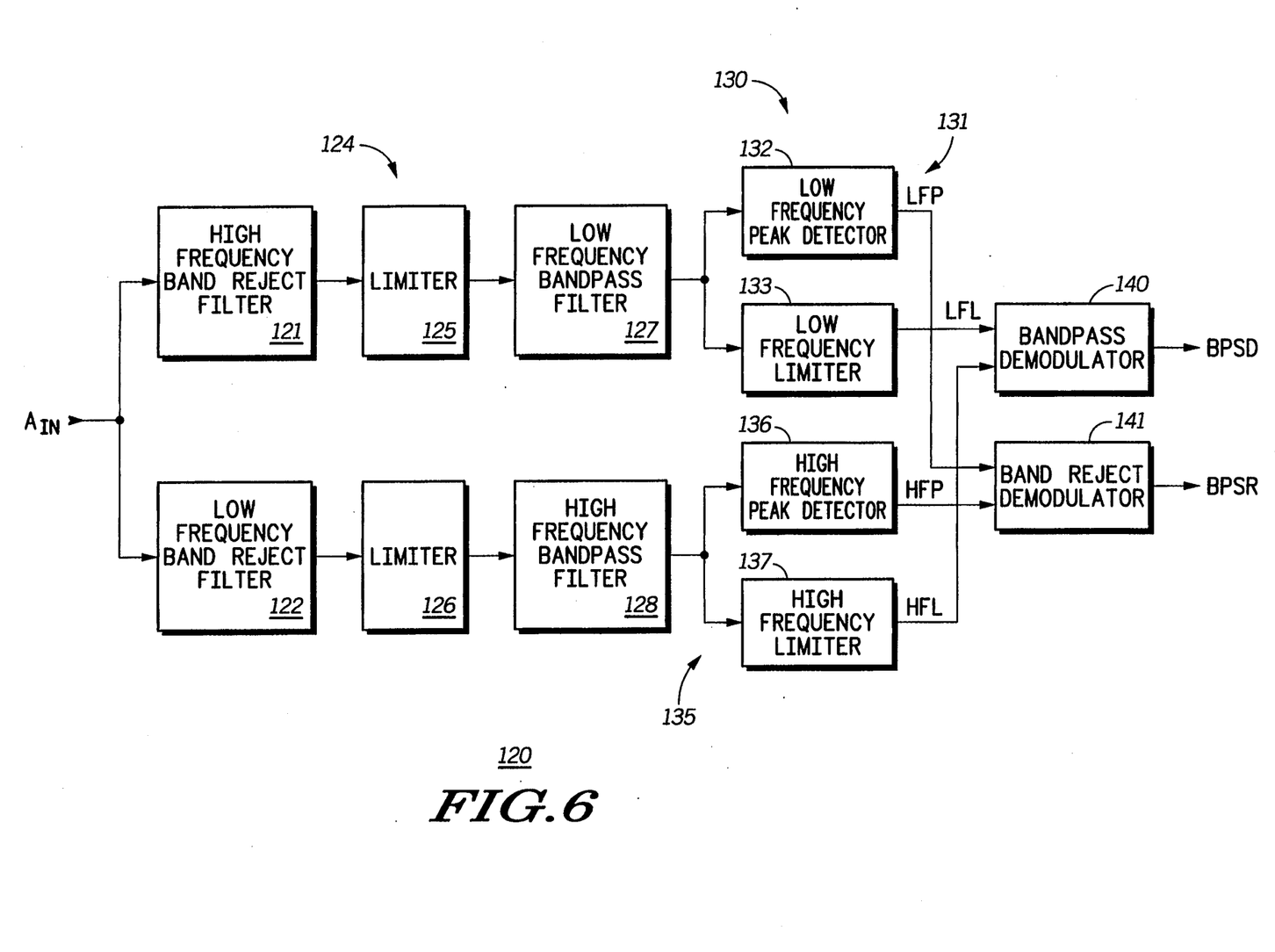
FIG. 6 illustrates in block diagram form one embodiment of the bandpass/band reject dual tone detector according to the present invention.

FIG. 6 illustrates in block diagram form one embodiment of a single-tone bandpass/band reject tone detector 120 according to the present invention. Tone detector 120 includes a high frequency band reject filter 121, a low frequency band reject filter 122, a limiter section 124, a low frequency bandpass filter 127, a high frequency bandpass filter 128, a processing section 130, a bandpass demodulator 140, and a band reject demodulator 141. High frequency band reject filter 121 has an input terminal for receiving signal $A_{IN}$, and an output terminal. Low frequency band reject filter 122 has an input terminal for receiving signal $A_{IN}$, and an output terminal.

Limiter section 124 includes limiters 125 and 126. Limiter 125 has an input terminal connected to the output terminal of high frequency band reject filter 121, and an output terminal. Limiter 126 has an input terminal connected to the output terminal of low frequency band reject filter 122, and an output terminal.

Low frequency bandpass filter 127 has an input terminal connected to the output terminal of limiter 125, and an output terminal. High frequency bandpass filter 128 has an input terminal connected to the output terminal of limiter 126, and an output terminal.

Processing section 130 includes a low frequency processing section 131 and a high frequency processing section 135. Low frequency processing section 131 includes a low frequency peak detector 132 and a low frequency limiter 133. Low frequency peak detector 132 has an input terminal connected to the output terminal of low frequency bandpass filter 127, and an output terminal for providing a signal labelled "LFP". Low frequency limiter 133 has an input terminal connected to the output terminal of low frequency bandpass filter 127, and an output terminal for providing a signal labelled "LFL". High frequency processing section 135 includes a high frequency peak detector 136, and a high frequency limiter 137. High frequency peak detector 136 has an input terminal connected to the output terminal of high frequency bandpass filter 128, and an output terminal for providing a signal labelled "HFP". High frequency limiter 137 has an input terminal connected to the output terminal of high frequency bandpass filter 128, and an output terminal for providing a signal labelled "HFL".

Bandpass demodulator 140 has a first input terminal for receiving signal LFL, a second input terminal for receiving signal HFL, and an output terminal for providing signal BPSD. Band reject demodulator 141 has a first input terminal for receiving signal LFP, a second input terminal for receiving signal HFP, and an output terminal for providing signal BRSD.

In operation, tone detector 120 detects a tone in signal $A_{IN}$ using both the bandpass technique and the band reject technique. Tone detector 120 implements these two techniques simultaneously, using many of the same filtering functions for both techniques, and thus saves circuit area. The operation of tone detector 120 will be described by the example of detecting a single DTMF "A" tone, which is represented as a low-frequency true tone at 697 Hz, and a high-frequency true tone at 1633 Hz. However it should be apparent that tone detector 120 is applicable to tone detection for any dual tone. In addition, tone detector 120 may be modified to fully detect all DTMF tones, as will be illustrated in FIG. 9 below.

For band reject tone detection, input signal $A_{IN}$ is first filtered in band reject filters 121 and 122. In the illustrated embodiment, band reject filters 121 and 122 are two-pole notch filters with transmission zeros at the frequency associated with the opposite band. However, other filters with adequate frequency response characteristics may also be used. High frequency band reject filter 121 thus has a zero at 1633 Hz. Limiter 125 then amplifies the signal components not rejected by converting them to square waves. Low frequency bandpass filter 127 passes only frequency components within a narrow passband centered around 697 Hz. If the amplitude of the signal at the input of low frequency peak detector 132 exceeds a predetermined threshold, then low frequency peak detector 132 activates signal LFP. Similarly, low frequency band reject filter 122 has a zero at 697 Hz. Limiter 126 then amplifies the signal components not rejected by converting them to square waves. High frequency bandpass filter 128 then passes only frequency components within a narrow passband centered around 1633 Hz. If the amplitude of the signal at the input of high frequency peak detector 136 exceeds the predetermined threshold, then high frequency peak detector 136 activates signal HFP. Band reject demodulator 141 then activates signal BRSD after both LFP and HFP are active for a length of time related to the signaling system's tone characteristics.

For bandpass tone detection, in which tone detector 120 provides signal BPSD, the signal at the output of limiter 125 is passed through low frequency bandpass filter 127, and then subsequently voltage limited in low frequency limiter 133. Bandpass demodulator 140 then determines the frequency by a suitable technique, such as by counting the number of zero crossings of signal LFL in the illustrated embodiment. Likewise, the signal at the output of limiter 126 is passed through high frequency bandpass filter 128, and then subsequently voltage limited in high frequency limiter 137. Bandpass demodulator 140 then determines the frequency by a suitable technique, such as by counting the number of zero crossings of signal HFL in the illustrated embodiment. If bandpass demodulator 140 determines that both signal HFL and LFL indicate their respective tone frequencies, then it activates signal BPSD.

Input signal $A_{IN}$ is preprocessed through high frequency band reject filter 121 and limiter 125, and low frequency band reject filter 122 and limiter 126 before being input to the respective bandpass filter. However, this preprocessing does not affect the bandpass frequency detection. Since high frequency band reject filter 121 only inserts a zero around 1633 Hz, the frequency domain characteristics around 697 Hz, the passband of interest to bandpass filter 127, is unaffected. Limiter 125 then amplifies this signal and converts a true tone to a square wave of the same frequency. However, according to Fourier's theorem, the square wave has frequency components at the fundamental and the odd harmonics thereof. The frequency components at the odd harmonics are sufficiently removed from in frequency from the fundamental as to be virtually eliminated by bandpass filter 127. Thus, adding band reject filter 121 and limiter 125 (and band reject filter 122 and limiter 126) as a front end to a bandpass detector does not affect the operation of the bandpass detector.

Figure 7:
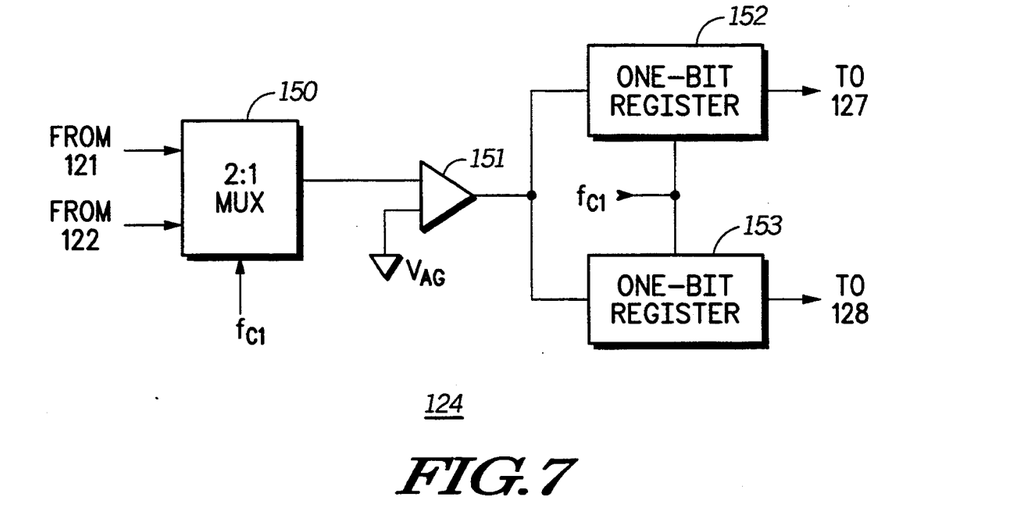
FIG. 7 illustrates a in partial block and partial logic diagram form a circuit implementation of the limiter section of FIG. 6.

FIG. 7 illustrates a in partial block and partial logic diagram form a circuit implementation of limiter section 124 of FIG. 6. All elements referred to but not shown in FIG. 7 are found in FIG. 6. Limiter section 124 is implemented by sharing a single amplifier 151. A two-to-one (2:1) multiplexer (MUX) 150 has a first input terminal connected to the output terminal of filter 121, a second input terminal connected to the output of filter 122, a control input for receiving a control signal labelled "$f_{C1}$", and an output terminal. Amplifier 151 is a high-gain amplifier connected in an open-loop configuration, having a first terminal connected to the output terminal of MUX 150, a second terminal for receiving analog ground voltage $V_{AG}$, and an output terminal. Since amplifier 151 is shared between both the low frequency and the high frequency detector paths, two one-bit registers 152 and 153 are needed to store the results thereof. Register 152 has an input terminal connected to the output terminal of amplifier 151, an output terminal connected to filter 127, and a control input terminal for receiving signal $f_{C1}$. Register 153 has an input terminal connected to the output terminal of amplifier 151, an output terminal connected to filter 128, and a control input terminal for receiving signal $f_{C1}$.

By way of example, in the illustrated embodiment register 152 latches data on its input terminal on a low-to-high transition of $f_{C1}$, and provides data at the output terminal thereof on a high-to-low transition of $f_{C1}$. Conversely, register 153 latches data on its input terminal on the high-to-low transition of $f_{C1}$, and provides data at the output terminal thereof on the low-to-high transition of $f_{C1}$. By sharing one amplifier and time-multiplexing the input thereof, limiter section 124 saves circuit area over an implementation using two separate limiters.

Figure 8:
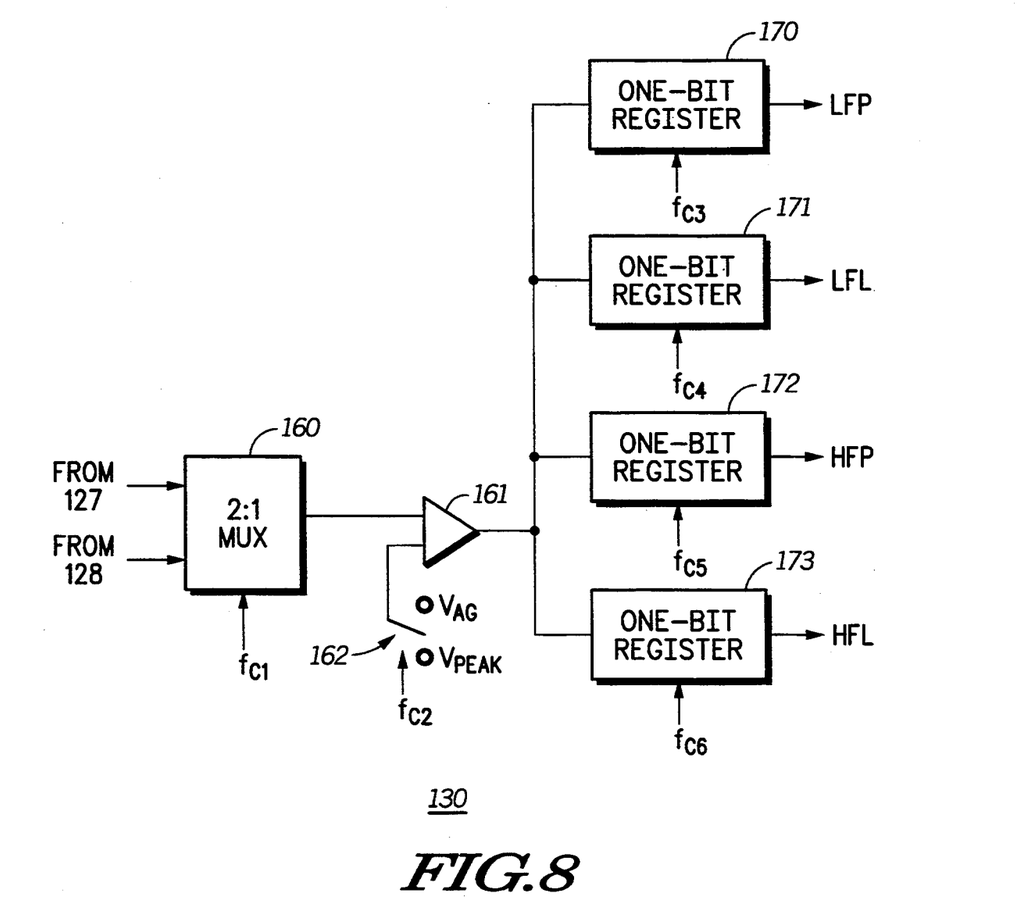
FIG. 8 illustrates a in partial block and partial logic diagram form a circuit implementation of the low and high frequency processing sections of FIG. 6.

FIG. 8 illustrates a in partial block and partial logic diagram form a circuit implementation of processing section 130 of FIG. 6. All elements referred to but not shown in FIG. 8 are found in FIG. 6. Processing section 130 is implemented by sharing a single amplifier 161. A two-to-one (2:1) multiplexer (MUX) 160 has a first input terminal connected to the output terminal of filter 127, a second input terminal connected to the output of filter 128, a control input for receiving control signal $f_{C1}$, and an output terminal. Amplifier 161 is a high-gain amplifier connected in an open-loop configuration, having a first terminal connected to the output terminal of MUX 160, a second terminal, and an output terminal. A switch 162 has a first terminal connected to the second input terminal of amplifier 161, and a second terminal alternately connected between voltages $V_{PEAK}$ and $V_{AG}$ and switched therebetween by a signal labelled "$f_{C2}$". Signal $f_{C2}$ switches twice as fast as signal $f_{C1}$. Since amplifier 161 is shared between both the low frequency and the high frequency detector paths, and between the peak detect and limit functions, four one-bit registers 170–173 are needed to store the results thereof. Register 170 has an input terminal connected to the output terminal of amplifier 161, an output terminal for providing signal LFP, and a control input terminal for receiving a signal labelled "$f_{C3}$". Register 171 has an input terminal connected to the output terminal of amplifier 161, an output terminal for providing signal LFL, and a control input terminal for receiving a signal labelled "$f_{C4}$". Register 172 has an input terminal connected to the output terminal of amplifier 161, an output terminal for providing signal HFP, and a control input terminal for receiving a signal labelled "$f_{C5}$". Register 173 has an input terminal connected to the output terminal of amplifier 161, an output terminal for providing signal HFL, and a control input terminal for receiving a signal labelled "$f_{C6}$".

Signal $f_{C2}$ switches at twice the rate as $f_{C1}$. Thus, during a first time period signal $f_{C1}$ selects the first input of MUX 160 and $f_{C2}$ configures amplifier 161 to be a peak detector; signal $f_{C3}$ causes register 170 to latch the logic level at the output of amplifier 161 to store signal LFP. Similarly, signals $f_{C4}$, $f_{C5}$, and $f_{C6}$ cause corresponding registers 171, 172, and 173 to latch signals whose function is selected in MUX 160 and amplifier 161 by signals $f_{C1}$ and $f_{C2}$, respectively. By sharing one amplifier and time-multiplexing the input thereof, processing section 130 saves circuit area over an implementation using two separate limiters.

Figure 9:
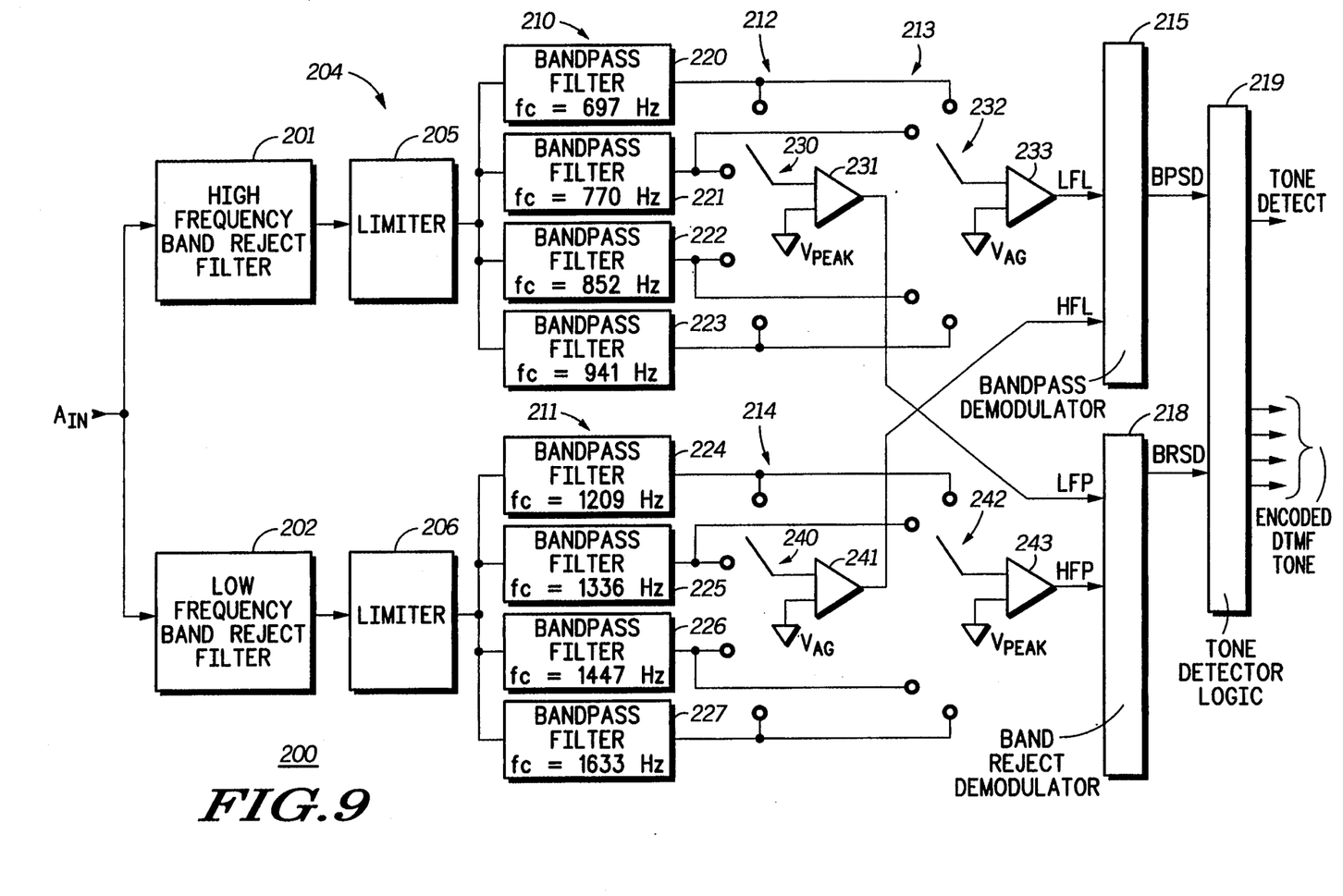
FIG. 9 illustrates in block diagram form a DTMF bandpass/band reject tone detector according to the present invention.

FIG. 9 illustrates in block diagram form a DTMF bandpass/band reject tone detector 200 according to the present invention. Tone detector 200 includes a high frequency band reject filter 201, a low frequency band reject filter 202, a limiter section 204, a low frequency bandpass filter section 210, a high frequency bandpass filter section 211, a processing section 212, a bandpass demodulator 215, a band reject demodulator 218, and tone detector logic block 219.

High frequency band reject filter 201 has an input terminal for receiving signal $A_{IN}$, and an output terminal. Low frequency band reject filter 202 has an input terminal for receiving signal $A_{IN}$, and an output terminal. Limiter section 204 includes limiters 205 and 206. Limiter 205 has an input terminal connected to the output terminal of high frequency band reject filter 201, and an output terminal. Limiter 206 has an input terminal connected to the output terminal of low frequency band reject filter 202, and an output terminal. Note that FIG. 9 illustrates limiter section 204 as including separate limiters 205 and 206, but the function of these limiters is preferably implemented with the multiplexed limiter shown in FIG. 7.

Low frequency bandpass filter section 210 includes bandpass filters 220–223, each of which has an input terminal connected to the output terminal of limiter 205, and an output terminal. Bandpass filters 220–223 have center frequencies (designated "$f_C$") of 697 Hz, 770 Hz, 852 Hz, and 941 Hz, respectively, associated with the low DTMF frequency band. High frequency bandpass filter section 211 includes bandpass filters 224–227, each of which has an input terminal connected to the output terminal of limiter 206, and an output terminal. Bandpass filters 224–227 have center frequencies $f_C$ of 1209 Hz, 1336 Hz, 1477 Hz, and 1633 Hz, respectively, associated with the high DTMF frequency band.

Processing section 212 includes a low frequency processing section 213, and a high frequency processing section 214. Low frequency processing section 213 includes a switch 230, an amplifier 231, a switch 232, and an amplifier 233. Switch 230 is a four-to-one switch designed to multiplex the outputs of each of bandpass filters 220–223 to the output terminal thereof. Amplifier 231 has a first input terminal connected to the output terminal of switch 230, a second input terminal connected to $V_{PEAK}$, and an output terminal for providing signal LFP. Switch 232 is a four-to-one switch designed to multiplex the outputs of each of bandpass filters 220–223 to the output terminal thereof. Amplifier 233 has a first input terminal connected to the output terminal of switch 232, a second input terminal connected to $V_{AG}$, and an output terminal for providing signal LFL.

High frequency processing section 214 includes a switch 240, an amplifier 241, a switch 242, and an amplifier 243. Switch 240 is a four-to-one switch designed to multiplex the outputs of each of bandpass filters 224–227 to the output terminal thereof. Amplifier 241 has a first input terminal connected to the output terminal of switch 240, a second input terminal connected to $V_{AG}$, and an output terminal for providing signal HFL. Switch 242 is a four-to-one switch designed to multiplex the outputs of each of bandpass filters 224–227 to the output terminal thereof. Amplifier 243 has a first input terminal connected to the output terminal of switch 242, a second input terminal connected to $V_{PEAK}$, and an output terminal for providing signal HFP.

Bandpass demodulator 215 has a first input terminal for receiving LFL, a second input terminal for receiving HFL, and an output terminal for providing signal BPSD. Band reject demodulator 218 has a first input terminal for receiving signal LFP, a second input terminal for receiving signal HFP, and an output terminal for providing signal BRSD. Tone detector logic block 219 has input terminals for receiving signals BPSD and BRSD, an output terminal for providing signal TONE DETECT, and output terminals for providing ENCODED DTMF TONE.

It should be apparent that DTMF bandpass/band reject tone detector 200 is a modification of tone detector 120 of FIG. 6 in order to select one of four possible low DTMF band tones and one of four possible high DTMF band tones. This result is accomplished by making high frequency band reject filter 201 a full band reject filter covering the high DTMF range from 1209 Hz to 1633 Hz. Thus, the order of the filter must be increased over filter 121 of FIG. 6. Similarly, low frequency band reject filter 202 is a full band reject filter covering the low DTMF range from 697 Hz to 941 Hz. Also, bandpass filters 127 and 128 of FIG. 6 are replaced by four filters 220–223 and 224–227, designed to pass a corresponding DTMF true tone, but the frequency response characteristics of each of these filters are similar to those of filters 127 and 128. In processing section 212, time-multiplexed limiters and comparators replace the simple limiters and peak detectors of detector 120. Finally, tone detector logic block 219 further determines which of the sixteen DTMF tones is being detected in a manner similar to demodulator 48 of FIG. 1. Tone detector logic block 219 maintains information on the multiplexing of inputs to the limiters and comparators in processing section 212, in order to provide ENCODED DTMF TONE.

While the invention has been described in the context of a preferred embodiment, it will be apparent to those skilled in the art that the present invention may be modified in numerous ways and may assume many embodiments other than that specifically set out and described above. For example, the disclosed tone detector is applicable to a single, dual frequency tone signaling system, or to a multiple tone system. A multiple tone system may be the common DTMF system used in North American telephony, or a like system. Multiple elements such as limiters and peak detectors may also be implemented discretely or use shared elements such as by time-multiplexing the signals. The elements may be implemented by the circuits illustrated in FIGS. 7 and 8 or by other sharing schemes. Accordingly, it is intended by the appended claims to cover all modifications of the invention which fall within the true spirit and scope of the invention.

I claim:

1. A dual tone detector operable in the presence of speech or background noise, comprising:
   a bandpass tone detector having an input for receiving an input signal conducted on a transmission line, and an output for providing a bandpass tone detect signal, said input signal characterized as intermittently including tones;
   a band reject tone detector having an input for receiving said input signal, and an output for providing a band reject tone detect signal; and
   logic means coupled to said bandpass tone detector and to said band reject tone detector, for providing a tone detect signal in response to both said bandpass tone detect signal being active and to said band reject tone detect signal being active, and for providing a mute signal in response to said bandpass tone detect signal being active and said band reject tone detect signal being inactive.

2. The dual tone detector of claim 1 further comprising input means coupled to said transmission line, for receiving a second input signal and for decoupling said second input signal from said transmission line in response to said mute signal.

3. The dual tone detector of claim 2, wherein said transmission line comprises a telephone line, and wherein said input means comprises a telephone line hybrid.

4. The dual tone detector of claim 1, wherein said band reject tone detector comprises:
   a first filter having an input coupled to said transmission line, and an output, said first filter attenuating frequencies around a high frequency;
   a second filter having an input coupled to said transmission line, and an output, said second filter attenuating frequencies around a low frequency;
   a first limiter having an input coupled to said output of said first filter, and an output;
   a second limiter having an input coupled to said output of said second filter, and an output;
   a third filter having an input coupled to said output of said first limiter, and an output, for passing frequencies around said low frequency;
   a fourth filter having an input coupled to said output of said second limiter, and an output, for passing frequencies around said high frequency;
   a first peak detector having an input coupled to said output of said third filter, and an output for providing a first peak detect output signal in response to a voltage at said output of said third filter exceeding a first predetermined voltage;
   a second peak detector having an input coupled to said output of said fourth filter, and an output for providing a second peak detect output signal in response to a voltage at said output of said fourth filter exceeding said first predetermined voltage; and
   a band reject demodulator having inputs for receiving said first and second peak detect output signals, and an output for providing said band reject tone detect signal.

5. The dual tone detector of claim 4, wherein said bandpass tone detector comprises:
   a third limiter having an input coupled to said output of said third filter, and an output for providing a first limit output signal in response to said voltage at said output of said third filter exceeding a second predetermined voltage;
   a fourth limiter having an input coupled to said output of said fourth filter, and an output for providing a second limit output signal in response to said voltage at said output of said fourth filter exceeding said second predetermined voltage; and
   a bandpass demodulator having inputs for receiving said first and second limit output signals, and an output for providing said bandpass tone detect signal in response.

6. The dual tone detector of claim 1, further characterized as being a dual tone multi-frequency (DTMF) detector.

7. The dual tone detector of claim 6, wherein said band reject tone detector comprises:
   a first filter having an input coupled to said transmission line, and an output, said first filter attenuating frequencies within a high frequency band;
   a second filter having an input coupled to said transmission line, and an output, said second filter attenuating frequencies within a low frequency band;
   a first limiter having an input coupled to said output of said first filter, and an output;
   a second limiter having an input coupled to said output of said second filter, and an output;
   a first plurality of bandpass filters each having an input coupled to said output of said first limiter, and an output, for passing frequencies within a corresponding plurality of DTMF frequencies within said low frequency band;
   a second plurality of bandpass filters each having an input coupled to said output of said second limiter, and an output, for passing frequencies within a corresponding plurality of DTMF frequencies within said high frequency band;
   first peak detector means coupled to said first plurality of bandpass filters, for detecting whether voltages at said output of each of said first plurality of bandpass filters exceed a predetermined threshold to provide a first plurality of peak detect signals in response;

second peak detector means coupled to said second plurality of bandpass filters, for detecting whether voltages at said output of each of said second plurality of bandpass filters exceed said predetermined threshold to provide a second plurality of peak detect signals in response; and band reject logic means coupled to said first and second peak detector means, for providing said band reject tone detect signal in response to an activation of one of said first plurality of peak detect signals and one of said second plurality of peak detect signals.

8. The dual tone detector of claim 7, wherein said bandpass tone detector comprises:

first limiter means coupled to said first plurality of bandpass filters, for limiting signals at outputs of each of said first plurality of bandpass filters to provide a corresponding plurality of first limited signals in response;

second limiter means coupled to said second plurality of bandpass filters, for limiting signals at outputs of each of said second plurality of bandpass filters to provide a corresponding plurality of second limited signals in response; and bandpass logic means coupled to said first and second limiter means, for providing said bandpass tone detect signal in response to an activation of one of said plurality of first limited signals and one of said plurality of second limited signals.

9. The dual tone detector of claim 6 wherein said logic means further provides a plurality of output signals indicative of a selected pair of tones of a plurality of pairs of DTMF tones.

10. A dual tone detector operable in the presence of speech or background noise comprising:

a first band reject filter having an input for being coupled to a transmission line, and an output, said first band reject filter attenuating frequencies around a high frequency;

a second band reject filter having an input for being coupled to said transmission line, and an output, said band reject filter attenuating frequencies around a low frequency;

limiter means coupled to said first and second band reject filters, for limiting voltages at said output of each of said first and second band reject filters to provide first and second limited signals, respectively;

a first bandpass filter having an input for receiving said first limited signal, and an output, for passing frequencies around said low frequency;

a second bandpass filter having an input for receiving said second limited signal, and an output, for passing frequencies around said high frequency;

processing means coupled to said output of each of said first and second bandpass filters, for providing a first peak detect signal and a third limited signal in response to a signal at said output of said first bandpass filter, and for providing a second peak detect signal and a fourth limited signal in response to a signal at said output of said second bandpass filter;

a bandpass demodulator having inputs for receiving said third and fourth limited signals, and an output for providing a bandpass tone detect signal; and a band reject demodulator having inputs for receiving said first and second peak detect signals, and an output for providing a band reject tone detect signal.

11. The dual tone detector of claim 10 wherein said processing means comprises:

a first peak detector having an input terminal coupled to said output terminal of said first bandpass filter, and an output terminal for providing said first peak detect signal;

a first limiter having an input terminal coupled to said output terminal of said first bandpass filter, and an output terminal for providing said third limited signal;

a second peak detector having an input terminal coupled to said output terminal of said second bandpass filter, and an output terminal for providing said second peak detect signal; and a second limiter having an input terminal coupled to said output terminal of said second bandpass filter, and an output terminal for providing said fourth limited signal.

12. The dual tone detector of claim 10, wherein said processing means comprises:

a multiplexer having a first input terminal coupled to said output of said first bandpass filter, a second input terminal coupled to said output of said second bandpass filter, and an output terminal;

an amplifier having a first input terminal coupled to said output terminal of said multiplexer, a second input terminal, and an output terminal;

a switch having a first terminal coupled to said second input terminal of said amplifier, and a second terminal alternately coupled to first and second reference voltages;

a first register having an input terminal coupled to said output terminal of said amplifier, and an output terminal for providing said first peak detect signal;

a second register having an input terminal coupled to said output terminal of said amplifier, and an output terminal for providing said first limited signal;

a third register having an input terminal coupled to said output terminal of said amplifier, and an output terminal for providing said second peak detect signal; and a fourth register having an input terminal coupled to said output terminal of said amplifier, and an output terminal for providing said second limited signal.

13. The dual tone detector of claim 10, wherein said limiter means comprises:

a multiplexer having a first input terminal coupled to said output of said first band reject filter, a second input terminal coupled to said output of said second band reject filter, and an output terminal;

an amplifier having a first input terminal coupled to said output terminal of said multiplexer, a second input terminal for receiving a reference voltage, and an output terminal;

a first register having an input terminal coupled to said output terminal of said amplifier, and an output terminal for providing said first limited signal; and a second register having an input terminal coupled to said output terminal of said amplifier, and an output terminal for providing said second limited signal.

14. A dual tone multi-frequency (DTMF) detector operable in the presence of speech or background noise comprising:

a first filter having an input for being coupled to a transmission line, and an output, said first filter attenuating frequencies within a high frequency band;

a second filter having an input for being coupled to said transmission line, and an output, said second filter attenuating frequencies within a low frequency band;

a first limiter having an input coupled to said output of said first filter, and an output;

a second limiter having an input coupled to said output of said second filter, and an output;

a first plurality of bandpass filters each having an input coupled to said output of said first limiter, and an output, for passing frequencies within a corresponding plurality of DTMF frequencies within said low frequency band;

a second plurality of bandpass filters each having an input coupled to said output of said second limiter, and an output, for passing frequencies within a corresponding plurality of DTMF frequencies within said high frequency band;

first peak detector means coupled to said first plurality of bandpass filters, for detecting whether voltages at said output of each of said first plurality of bandpass filters exceed a predetermined threshold to provide a first plurality of peak detect signals in response;

second peak detector means coupled to said second plurality of bandpass filters, for detecting whether voltages at said output of each of said second plurality of bandpass filters exceed said predetermined threshold to provide a second plurality of peak detect signals in response;

first limiter means coupled to said first plurality of bandpass filters, for limiting signals at outputs of each of said first plurality of bandpass filters to provide a corresponding plurality of first limited signals in response;

second limiter means coupled to said second plurality of bandpass filters, for limiting signals at outputs of each of said second plurality of bandpass filters to provide a corresponding plurality of second limited signals in response;

bandpass logic means coupled to said first and second limiter means, for providing a bandpass tone detect signal in response to an activation of one of said plurality of first limited signals and one of said plurality of second limited signals; and band reject logic means coupled to said first and second peak detector means, for providing a band reject tone detect signal in response to an activation of one of said first plurality of peak detect signals and one of said second plurality of peak detect signals.

15. A method for detecting a dual tone in the presence of speech or background noise, comprising the steps of:

receiving an input signal via a transmission line;

detecting a tone in said input signal in a bandpass tone detector to provide a bandpass tone detect signal in an active state thereof to indicate a detection of said tone;

detecting said tone in said input signal in a band reject tone detector to provide a band reject tone detect signal in an active state thereof to indicate a detection of said tone;

providing a tone detect output signal in response to both said bandpass tone detect signal being active and to said band reject tone detect signal being active; and muting a voice input signal from said transmission line in response to said bandpass tone detect signal being active and said band reject tone detect signal being inactive and thereafter repeating said steps of detecting a tone in said input signal in said bandpass tone detector, detecting said tone in said input signal in said band reject tone detector, and providing said tone detect output signal in response to both said bandpass tone detect signal being active and to said band reject tone detect signal being active.

16. The method of claim 15 wherein said step of detecting said tone in said input signal in a band reject tone detector comprises the steps of:

filtering said input signal to reject frequencies around a second frequency to provide a first signal;

filtering said input signal to reject frequencies around a first frequency to provide a second signal;

limiting said first signal to provide a first limited signal;

limiting said second signal to provide a second limited signal;

filtering said first limited signal around said first frequency to provide a first bandpass filtered signal;

filtering said second limited signal around said second frequency to provide a second bandpass filtered signal;

detecting a peak in said first and second bandpass filtered signals to provide first and second peak detect signals, respectively; and providing a band reject tone detect signal in response to said first and second peak detect signals.

17. The method of claim 16 wherein said step of detecting a tone in said input signal in said bandpass tone detector comprises the steps of:

limiting said first and second bandpass filtered signals to provide third and fourth limited signals, respectively; and providing said bandpass tone detect signal in response to said third and fourth limited signals.

18. A method for detecting a DTMF tone in the presence of speech or background noise, comprising the steps of:

receiving an input signal via a transmission line;

filtering said input signal to reject frequencies around a second frequency to provide a first signal;

filtering said input signal to reject frequencies around a first frequency to provide a second signal;

limiting said first signal to provide a first limited signal;

limiting said second signal to provide a second limited signal;

filtering said first limited signal around said first frequency to provide a first bandpass filtered signal;

filtering said second limited signal around said second frequency to provide a second bandpass filtered signal;

limiting said first and second bandpass filtered signals to provide third and fourth limited signals, respectively;

detecting a peak in said first and second bandpass filtered signals to provide first and second peak detect signals, respectively;

providing a bandpass tone detect signal in response to said third and fourth limited signals; providing a band reject tone detect signal in response to said first and second peak detect signals; and providing a tone detect signal in response to both said bandpass tone detect signal and to said band reject tone detect signal.

19. The method of claim 18 further comprising the step of:

muting a voice signal from said transmission line in response to said bandpass tone detect signal being active and to said band reject tone detect signal being inactive; and providing said tone detect signal in response to a subsequent activation of both said bandpass tone detect signal and to said band reject tone detect signal.

* * * * *